May 25, 1943.  E. J. SHIMEK  2,320,248
METHOD FOR SEISMIC SURVEYING
Filed Jan. 7, 1942

Inventor
Edwin J. Shimek
By
Attorney

UNITED STATES PATENT OFFICE 2,320,248

METHOD FOR SEISMIC SURVEYING

Edwin J. Shimek, Dallas, Tex., assignor to Socony-Vacuum Oil Company, Incorporated, New York, N. Y., a corporation of New York Application January 7, 1942, Serial No. 425,821

2 Claims. (Cl. 181—0.5)

This invention relates to the art of geophysical prospecting and more particularly to a reflection method of seismic survey.

The methods almost universally practised heretofore in conducting geophysical surveys by the reflection seismic method have utilized a single explosive charge for the creation of seismic waves in the earth's surface that are to be recorded on a particular spread by a plurality of geophones. Such an impulse delivered to the earth's surface would create a complex train of waves having no frequency discrimination, resulting in a wide band of frequencies being transmitted through the earth to the detecting instruments.

It is an object of this invention to emphasize selected narrow bands of frequencies by delivering a series of successive impulses to the earth's surface at a definite rate to create a train of waves of emphasized selected narrow bands of frequencies which can be amplified after detection by a critically tuned amplifier, integrated, and recorded in coordination with time.

In the prior art, the McCollum patent, Number 1,899,970 and the Vorhees patent, Number 2,064,451 disclose methods and apparatus for seismic prospecting which utilize respectively, a number of spaced charges that are fired successively at a predetermined rate to emphasize reflected waves that are detected simultaneously by a single detecting device, and a plurality of charges of explosives which have been substantially vertically spaced and detonated simultaneously to produce a sustained wave having approximately constant amplitude for a considerable number of cycles.

Another object of this invention resides in the provision of a method for controlling the width of the band or bands of frequencies that it is desired to emphasize by varying the number of impulses applied to the earth's surface.

Other objects and advantages of this invention will become apparent from the following detailed description when considered in connection with the drawing, in which.

Figure 1:
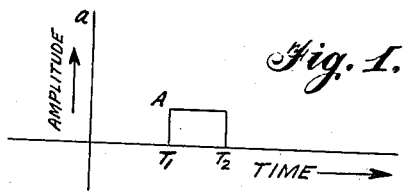
Figure 1 is an illustration of a square top wave or impulse such as that delivered to the earth's surface by the detonation of a single charge of explosives.
Figure 2:
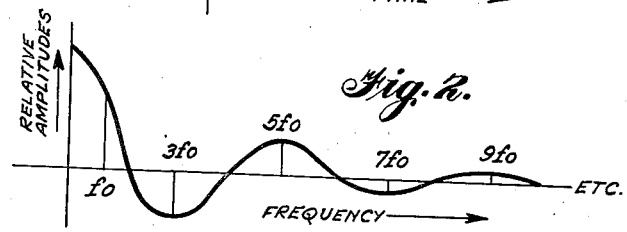
Figure 2 is a curve which has been plotted with relative amplitude as ordinates and frequency as abscissae showing the component frequencies contained in a square top wave or impulse.
Figure 3:
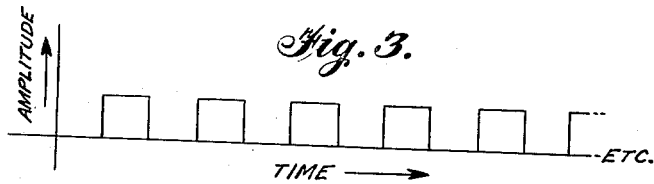
Figure 3 shows a steady-state rectangular wave which has been plotted with amplitude as ordinates and time as abscissae.

Referring to the drawing in detail, an impulse, such as would be delivered to the earth's surface by the detonation of a single charge of explosives can be represented as shown in Figure 1, by a square top wave which has been plotted with amplitude as ordinates and time as abscissae. This wave by Fourier integral analysis can be broken down into a frequency spectrum as shown in Figure 2.

Representing the fundamental frequency by $f_0$, and the harmonics by $2f_0$, $3f_0$, $4f_0$, $5f_0$, etc., it can be seen that in the vicinity of $f_0$ and the odd harmonics, that the energy in the components is relatively large, while in the vicinity of the even harmonics the frequency components become zero.

The analysis of this square top wave utilizing both the building-up portion of the impulse applied at a time $T_1$ and the dying down portion applied at a time $T_2$ is well known in the communication art as shown in Shea's book on "Transmission Networks and Wave Filters," and is as follows:

This wave, as disclosed by Figure 1, is composed of one wave changing in amplitude from $-A/2$ to $+A/2$ at a time $t=T_1$ and another that changes from $+A/2$ to $-A/2$ at a time $t=T_2$.

Therefore this combined wave contains no unidirectional energy. The total pulse is represented by $$a = \frac{A}{\pi}\int_0^\infty \frac{1}{\omega} \sin \omega(t-T_1)d\omega -$$

$$\frac{A}{\pi}\int_0^\infty \frac{1}{\omega} \sin \omega(t-T_2)d\omega \quad (1)$$

$$= \frac{A}{\pi}\int_0^\infty \frac{1}{\omega}[\sin \omega(t-T_1) - \sin \omega(t-T_2)]d\omega \quad (2)$$

But $$\sin x - \sin y = 2 \sin \frac{x-y}{2} \cos \frac{x+y}{2}$$

$$\therefore a = \frac{A}{\pi}\int_0^\infty \frac{1}{\omega}\left(2 \sin \omega \frac{T_2-T_1}{2}\right)\cos \omega\left(t - \frac{T_2+T_1}{2}\right)d\omega \quad (3)$$

Call $T_2-T_1$ the half period, and let its frequency be $f_0$, then $$f_0 = \frac{1}{2(T_2-T_1)} \quad (4)$$

or $$T_2-T_1 = \frac{1}{2f_0}$$

whence, by substitution in (3), a factor is obtained $$2 \sin \frac{\pi}{2} \frac{f}{f_0} = 2 \sin \frac{\pi}{2} \frac{\omega}{\omega_0} \quad (5)$$

Multiplying this factor by $$\frac{A}{\pi \omega} d\omega,$$

then Equation 3 coefficients become $$\frac{A}{\pi} \frac{d\omega}{\omega}\left(2 \sin \frac{\pi}{2} \frac{\omega}{\omega_0}\right) = \frac{A}{\omega_0} \frac{\sin\left(\frac{\pi}{2} \frac{\omega}{\omega_0}\right)}{\frac{\pi}{2} \frac{\omega}{\omega_0}}$$

and this is an expression which indicates the frequency content of a single impulse and when plotted will appear as shown in Figure 2.

Through the medium of a Fourier series expression for a steady-state rectangular wave, it can be seen how a train of such pulses can be considered to show how the continuous bands of frequency components required for a single impulse tend to revert to isolated finite harmonic components. A Fourier expression may be derived with the following results:

$$a = \frac{A}{2} + \frac{A}{\pi}(\cos \omega_0 t - 1/3 \cos 3 \omega_0 t +$$
$$1/5 \cos 5 \omega_0 t + \ldots) \quad (6)$$

where $f_0 = \omega_0/2\pi$ is the fundamental frequency.

Figure 4:
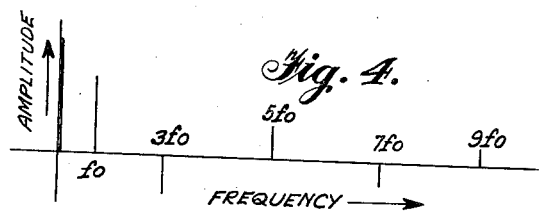
Figure 4 is an illustration of the discrete frequencies produced by a continuous series of pulses.
Figure 5:
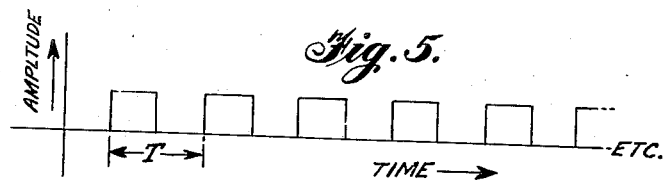
Figure 5 shows a steady-state rectangular wave representing the application of, for example, nine impulses per second to the earth's surface.

The coefficients of the components at the frequencies $0, f_0, 3f_0, 5f_0$, etc., are $$\frac{A}{2}, \frac{A}{\pi}, -\frac{A}{3\pi}, \frac{A}{5\pi}, \text{ etc.}$$

and when plotted will appear as shown in Figure 4.

That these coefficients are in the same ratios as those of the infinitesimal components at the same frequencies in a single pulse is shown in Figure 2.

Assume a single impulse to be timed to occur in such a manner that its curve will lie symmetrical to the vertical axis, then $$a = \frac{A}{\pi} \int_0^\infty \frac{1}{\omega}\left(2 \sin \omega \frac{T}{4}\right) \cos \omega t \, d\omega \quad (7)$$

$$= \frac{A}{\pi} \int_0^\infty \frac{1}{\omega}\left(2 \sin \frac{\pi}{2} \frac{f}{2f_0}\right) \cos \omega t \, d\omega$$

where $T/2 = T_2 - T_1$ is the period of duration of the pulse, and the components of the impulse are distributed as shown in Figure 2.

Additionally, assume the number of impulses per second to be increased to three spaced symmetrically with the vertical axis. This train of impulses then has an instantaneous amplitude $$a = \frac{A}{\pi} \int_0^\infty \frac{1}{\omega}\left(2 \sin \frac{\pi}{2} \frac{f}{f_0}\right)$$

$$X[\cos \omega(t+T) + \cos \omega t + \cos \omega(t-T)] d\omega \quad (8)$$

since $$2 \sin \omega \frac{T_2-T_1}{2} = 2 \sin \frac{\pi}{2} \frac{f}{f_0} = 2 \sin \omega \frac{T}{4} \quad (9)$$

is the same for each pulse of the train, and the instant $$\frac{T_2+T_1}{2}$$

of Equation 3 for each pulse corresponds to $-T$, 0, and $+T$, respectively.

Then since $$\cos \omega (t+T) + \cos \omega (t-T) = 2 \cos \omega t \cos \omega T, \quad (10)$$

Equation 8 becomes $$a = \frac{A}{\pi} \int_0^\infty \frac{1}{\omega}\left(2 \sin \frac{\pi}{2} \frac{f}{f_0}\right)(1 + 2 \cos \omega T) \cos \omega t \, d\omega$$
$$(1)$$

$$= \frac{A}{\pi} \int_0^\infty \frac{1}{\omega}\left(2 \sin \frac{\pi}{2} \frac{f}{f_0}\right)\left(1 + 2 \cos 2\pi \frac{f}{f_0}\right) \cos \omega t \, d\omega$$

This expression for the train of three pulses differs from Equation 7 for one pulse in that the coefficients of the components are, for each frequency, multiplied by the value of the factor $$1 + 2 \cos 2\pi \frac{f}{f_0}$$

which when plotted would show that the components in the vicinity of $0, f_0, 3f_0, 5f_0$, etc. stand out much more strongly than they do in the curve shown in Figure 2.

Figure 6:
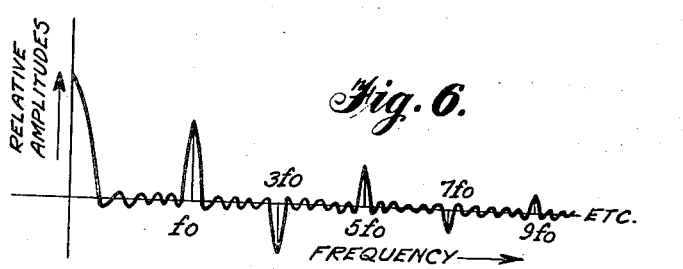
Figure 6 is a curve showing the frequency distribution of components in a nine-pulse wave.

For a limited number of pulses delivered to the earth's surface per second, for example, nine, a frequency spectrum is obtained which will lie between the single pulse case illustrated in Figure and the steady-state case illustrated in Figure and is illustrated in the drawing by Figure 6.

By increasing the number of impulses in the train to nine per second, instead of three, and assume that the pulses are spaced symmetrical with the vertical axis, then four and one-half pulses occur prior to the time $t=0$, and four and one-half pulses occur subsequent to it. For purpose of illustration, the train of nine impulses considered to be made up of groups of three impulses. Then the central group will be given by Equation 11 and the others differing therefrom only in that there is substituted $(t+3T)$ for $t$ the first train and $t-3T$ for $t$ in the last train. Then $$a = \frac{A}{\pi} \int_0^\infty \frac{1}{\omega}\left(2 \sin \frac{\pi}{2} \frac{f}{f_0}\right)\left(1 + 2 \cos 2\pi \frac{f}{f_0}\right) \quad (1)$$

$$X[\cos \omega(t+3T) + \cos \omega t + \cos \omega(t-3T)] d\omega.$$

But $$\cos \omega(t+3T) + \cos \omega(t-3T) =$$
$$2 \cos \omega t \cos \omega(3T) \quad (1)$$

whence $$a = \frac{A}{\pi} \int_0^\infty \frac{1}{\omega}\left[2 \sin \frac{\pi}{2} \frac{f}{f_0}\right]\left[1 + 2 \cos 2\pi \frac{f}{f_0}\right]$$

$$X[1 + 2 \cos \omega(3T)] \cos \omega t \, d\omega$$

$$= \frac{A}{\pi} \int_0^\infty \frac{1}{\omega}\left[2 \sin \frac{\pi}{2} \frac{f}{f_0}\right]\left[1 + 2 \cos 2\pi \frac{f}{f_0}\right] \quad (:$$

$$X\left[1 + 2 \cos 6\pi \frac{f}{f_0}\right] \cos \omega t \, d\omega$$

and the frequency distribution of the components differs from that of the three-pulse train only that the components are, for each frequency multiplied by the factor $$1 + 2 \cos 6\pi \frac{f}{f_0}$$

This factor is identical with that for a three pulse group, except that it alternates three times as rapidly with changes in frequency By plotting the Equation 14, a curve is obtained as illustrated in Figure 6. From this curve can be seen, first, that the greater amplitudes frequency component in the vicinity of the c multiples of $f_0$, as compared to those of the single impulses, are made possible by the larger amount of energy contained by the nine-pulses.

It will be noted that the amplitude of the components in the vicinity of the odd harmonic frequencies is increased and the maximum amplitude of the bands are proportional to the number of pulses. The amplitudes at the other frequencies decrease as the number of pulses are increased.

A second observation to be noted from the curves shown in Figures 2 and 6 is that the width of each frequency band becomes smaller in proportion to the rate of increase of impulses per second.

From the above explanation it is apparent to those skilled in the art that by employing a string of powder charges and detonating them progressively at substantially the same point at a predetermined rate to produce a series of impulses, wave bands of selected frequency can be emphasized while the amplitude of the other frequencies is decreased.

It is proposed to employ detecting means that will consist of instruments tuned to these selected bands of frequencies in the neighborhood of $f_0$, $3f_0$, $5f_0$, etc., and a means for integrating a series of pulses into a single pulse. The receiving systems should be sharply tuned for two important reasons, one of which is that the excluded lowest frequency band contains the surface disturbances, such as the slow travelling surface waves, wind stray, etc. The second reason is that it may be desirable to vary $f_0$, $3f_0$, $5f_0$, etc. by changing the rate of firing at the shot point and to vary the tuning of the receiving apparatus correspondingly at the receiving end in order to obtain the best reflections from a given horizon.

This system in addition to offering a practical means of approaching the continuous frequency system in that powder and its large potential energy can be used, also provides the advantage over the single impulse method that the energy is localized in rather narrow bands of frequencies and hence the recording system can be tuned sharply to those bands.

I claim:

1. In a method of seismic prospecting that comprises creating seismic waves in the earth's surface, detecting the waves after reflection from the interfaces of the substrata by generating corresponding electrical signals and recording the electrical signals in coordination with time that comprises creating seismic waves in the earth's surface by delivering mechanical impulses to the earth's surface at a rate that will produce signals having frequencies falling within predetermined narrow wave bands, selectively detecting said signals, electrically integrating the detected signals and recording the resultant signal in coordination with time.

2. A method of seismic prospecting that comprises the steps of detonating a plurality of explosive charges at substantially a common point on or within the surface of the earth at a predetermined rate to create seismic waves having emphasized narrow bands of frequencies, detecting waves falling within a predetermined narrow band of frequencies at one or more points removed from the point of creation of the seismic waves, after the seismic waves have been reflected from at least one interface of the sub-strata, integrating the detected waves to produce signals corresponding to a single impulse, and recording the integrated signal in coordination with time.

EDWIN J. SHIMEK.